(12) United States Patent
Park et al.

(10) Patent No.: US 7,869,761 B2
(45) Date of Patent: Jan. 11, 2011

(54) RADIO REPEATER FOR MOBILE COMMUNICATION SYSTEM AND REPEATING METHOD USING THE SAME

(75) Inventors: Sung-Youl Park, Seoul (KR); Sung-Min Cho, Seoul (KR); Gyeong-Ho Choi, Seoul (KR); Byung-Suk Lee, Ansan-si (KR); Jong-Tae Ihm, Seongnam-si (KR); Joo-Sik Lee, Seoul (KR); Sung-Jun Baik, Daejeon (KR); Seong-Keun Kim, Seoul (KR)

(73) Assignees: Airpoint Co., Ltd., Daejeon (KR); SK Telecom Co., Ltd., Seoul (KR)

( * ) Notice: Subject to any disclaimer, the term of this patent is extended or adjusted under 35 U.S.C. 154(b) by 0 days.

(21) Appl. No.: 11/575,986

(22) PCT Filed: Dec. 20, 2006

(86) PCT No.: PCT/KR2006/005596

§ 371 (c)(1),
(2), (4) Date: Jun. 29, 2009

(87) PCT Pub. No.: WO2007/073092

PCT Pub. Date: Jun. 28, 2007

(65) Prior Publication Data

US 2009/0286474 A1    Nov. 19, 2009

(30) Foreign Application Priority Data

Dec. 22, 2005    (KR) .................... 10-2005-0127580

(51) Int. Cl.
*H04B 7/14* (2006.01)

(52) U.S. Cl. .................. 455/24; 455/11.1; 455/20; 455/18

(58) Field of Classification Search ............ 455/20, 455/24, 23, 22, 11.1, 18, 67.11, 7
See application file for complete search history.

(56) References Cited

U.S. PATENT DOCUMENTS 5,396,189 A * 3/1995 Hays ........................ 330/149

(Continued)

FOREIGN PATENT DOCUMENTS

JP    11-122156    4/1999

(Continued)

OTHER PUBLICATIONS

Japanese Office Acton for Japanese application No. 2007-551211, citing the attached references, May 13, 2010.

(Continued)

*Primary Examiner*—John Lee
(74) *Attorney, Agent, or Firm*—Lowe Hauptman Ham & Berner LLP (57) ABSTRACT

Disclosed herein is a radio frequency (RF) repeater comprising an analog signal processing unit and a digital signal processing unit, wherein the analog signal processing unit includes a filtering unit; an amplification unit on receiving side; a frequency conversion unit on receiving side; a frequency conversion unit on transmitting side; and an amplification unit on transmitting side, and the digital signal processing unit includes a receiving signal detection unit; the automatic gain control unit; a feedback signal detection unit; a feedback signal combining unit; a feedback signal elimination unit; an automatic delay control unit; and the control unit.

According to the RF repeater and repeating method, installation cost is reduced, limitations in output magnitude and installation are overcome, and ensuring high output power characteristics.

12 Claims, 7 Drawing Sheets

U.S. PATENT DOCUMENTS 6,418,227 B1 * 7/2002 Kuo .................. 381/71.11

FOREIGN PATENT DOCUMENTS

| | | |
|---|---|---|
| JP | 2003-174392 | 6/2003 |
| JP | 2003-232388 | 8/2003 |
| JP | 2004-040665 | 2/2004 |
| JP | 2004-048202 | 2/2004 |
| JP | 2004-187135 | 7/2004 |
| JP | 2004-242236 | 8/2004 |
| JP | 2004-328286 | 11/2004 |
| KR | 1020030067330 | 8/2003 |

OTHER PUBLICATIONS

International Search Report of PCT/KR2006/005596, Mar. 2007.

* cited by examiner

RADIO REPEATER FOR MOBILE COMMUNICATION SYSTEM AND REPEATING METHOD USING THE SAME

CROSS REFERENCE TO RELATED APPLICATION

This application is the National Phase application of International Application No. PCT/KR2006/005596, filed Dec. 20, 2006, which designates the United States and was published in English. This application, in its entirety, is incorporated herein by reference.

TECHNICAL FIELD

The present invention relates to an apparatus and method of a radio frequency (RF) repeater in use for the improvement of quality of service in mobile communication systems. In particular, this RF repeater estimates feedback interference signals which are transmitted from a transmitting antenna and fed back to a co-located receiving antenna, and eliminates these feedback signals, and, thus can improve the quality of service by avoiding the oscillation.

BACKGROUND ART

Generally, a RF repeater extends the cell coverage which provides mobile communication services at low cost even in shadow areas, such as the inside of a building or underground, and that is used to increase subscriber capacity and for services in specific areas. However, in the radio frequency repeater, transmitting and receiving antennas are located at adjacent distance each other, so those transmission signals from a transmitting antenna are fed back to a receiving antenna, thereby causing the performance degradation of the repeater.

Figure 1:
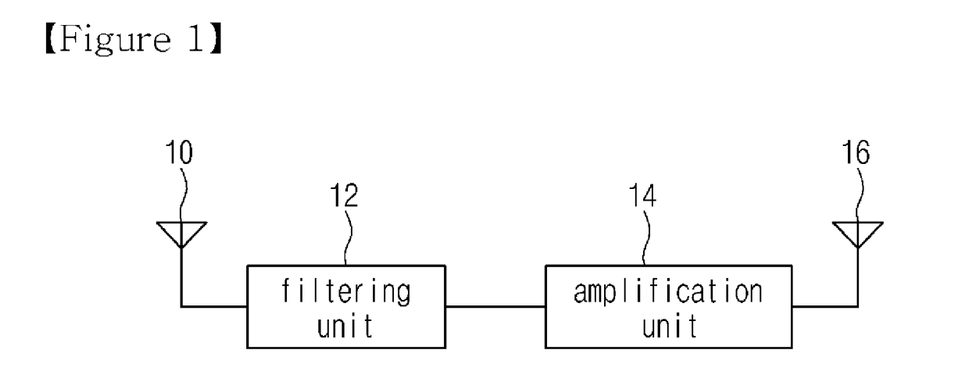
FIG. 1 is a diagram illustrating an example of a general radio repeater.

FIG. 1 is a diagram illustrating an example of a general radio frequency repeater for forward link.

As illustrated in FIG. 1, a general radio repeater includes a first antenna 10 (called donor antenna) for receiving signals to be repeated, a band-pass filtering unit 12 for filtering out unwanted frequency components from signals received from the first antenna 10, an amplification unit 14 for amplifying signals output from the filtering unit 12, and a second antenna 16 for transmitting the signals, which are amplified by the amplification unit 14, to the service area.

In mobile communication systems, such as CDMA or WCDMA, radio frequency repeaters have a forward link and reverse link. The forward link in the repeater receives radio signals from a base station, amplifies and transmits them toward a service area. On the other hand, the reverse link in the repeater receives radio signals from the service area such as mobile station, amplifies and transmits them to the base station. Since the structure and operation of the forward and reverse link are substantially the same and symmetric except the direction, only the operation of the forward link of the repeater will be described below.

In the radio frequency repeater illustrated in FIG. 1, there is a problem in that, if signals output from the second antenna 16 is strong, the transmitted signals from antenna 16 are fed back to the first antenna 10, and then amplified and are transmitted through the second antenna 16 again, thereby causing an oscillation problem. In order to avoid such oscillation phenomenon, the transmitting and receiving antennas, 10 and 16, must be placed far a part each other such that the extent of isolation between the first antenna 10 and the second antenna 16 is higher than an amplification gain, thereby there being a disadvantage in that increasing the installation cost. Furthermore, there exist constraints in which the amplification gain of a radio frequency repeater should be designed to have a decreased value in order to minimize the side effects of the aforementioned feedback phenomenon.

There have been proposed a lot of techniques to eliminate feedback signals which are electrically undesired signals in radio frequency repeaters. The basic concept of eliminating signal is to add the two signals which have the same amplitude and same frequency but have shifted 180 degree in phase. As the same procedure mentioned above, we can eliminate the feedback signals by adding the signals that have the same amplitude and frequency but have shifted 180 degree in phase to the feedback signal.

That is, because signals transmitted through the second antenna 16 are fed back into the first antenna 10, thereby generating oscillation, a method of estimating and eliminating signals transmitted through the second antenna 16 among signals received through the first antenna 10 can be implemented by estimating and subtracting signals transmitted through the second antenna 16 from signals received through the first antenna 10.

Existing technologies for eliminating undesired feedback interference signals, two techniques have been introduced. One is an analog processing technique of processing radio frequency (RF) signals without conversion into digital signals, the other technique is digital processing technique that include down converter converting first RF signal to Intermediate frequency (IF) signal, converting the IF signal to digital signal and processing the digital signal with digital signal processing techniques. After the completion of processing digital signal, the digital signals are converted to IF signal and RF signals and transmitted through transmission antenna. Generally, the analog processing method is implemented by compensating the amplitude, phase, delay, or the like of signals using dedicated hardware, so that, for the degree of flexibility is low, high cost is required and accuracy is degraded.

In contrast, in the case of digital processing method, the processing is performed using software based on digital signal processing technique, so that circuit construction is simple and the degree of flexibility is high, thereby much being used.

As an example of prior art using such technology, there are Korean Patent No. 03422002 (patented in 2002 Jul. 2, entitled "Adaptive Feedback Interference and Noise Eliminating Device), Korean Patent Publication No. 2002-0092031 (published in 2002 Dec. 11 and entitled "Radio Repeater of Mobile Communication System"), Korean patent Publication No. 2003-0069522 (published in 2002 Feb. 21 and entitled "Wideband Radio Repeater Using Interference Signal Elimination Technique of Mobile Communication System"), and Korean patent Publication No. 2003-0066062 (published in 2002 Feb. 4 and entitled (Free-oscillation Radio Repeater and Method therefore").

Technologies for eliminating feedback signals transmitted from a transmitting antenna among signals received through a receiving antenna, which are disclosed in the above prior arts, generally include an interference signal estimation unit for estimating signals transmitted through a second antenna, an interference elimination signal generating unit for generating interference elimination signals, the amplitude and magnitude of which are identical to those of the estimated interference signals and the phase of which is shifted by 180 degrees, an interference signal eliminating unit and the like.

The above Korean Patent No. 03422002, disclosing an analog processing method which processes radio frequency signals systematically, has disadvantage in that there is limitation in adapting to noise or distortion occurring in various operational environments surrounding antennas, and the efficiency of elimination of multi-path feedback interference signal decreases because multi-path channels can not be simultaneously processed.

Furthermore, the Korean Publication No. 2002-0092031 disclosing have an initial mode prior to normal operation for estimation of feedback noise using a specific tone and followed by normal operation mode after establishing channel estimation. So aforementioned patent have disadvantage in that normal operation service should be terminated and it switches to initial mode to adapt changing environment when oscillation occurs in the normal operation mode. These phenomena degrade the service of quality even more can not service during estimation mode. So it provide multi stage inverse-phased combiner in order to reflect various operation environments, but a fixed number of multi-stage combiners implemented by hardware have limitation to accommodate various propagation environments which continuously vary.

Furthermore, the above disclosed Korean patent Publication No. 2003-0069522 adopted the technology by expanding the above-described concept to control the phase and gain in order to have the same phase for each channel respectively.

Figure 2:
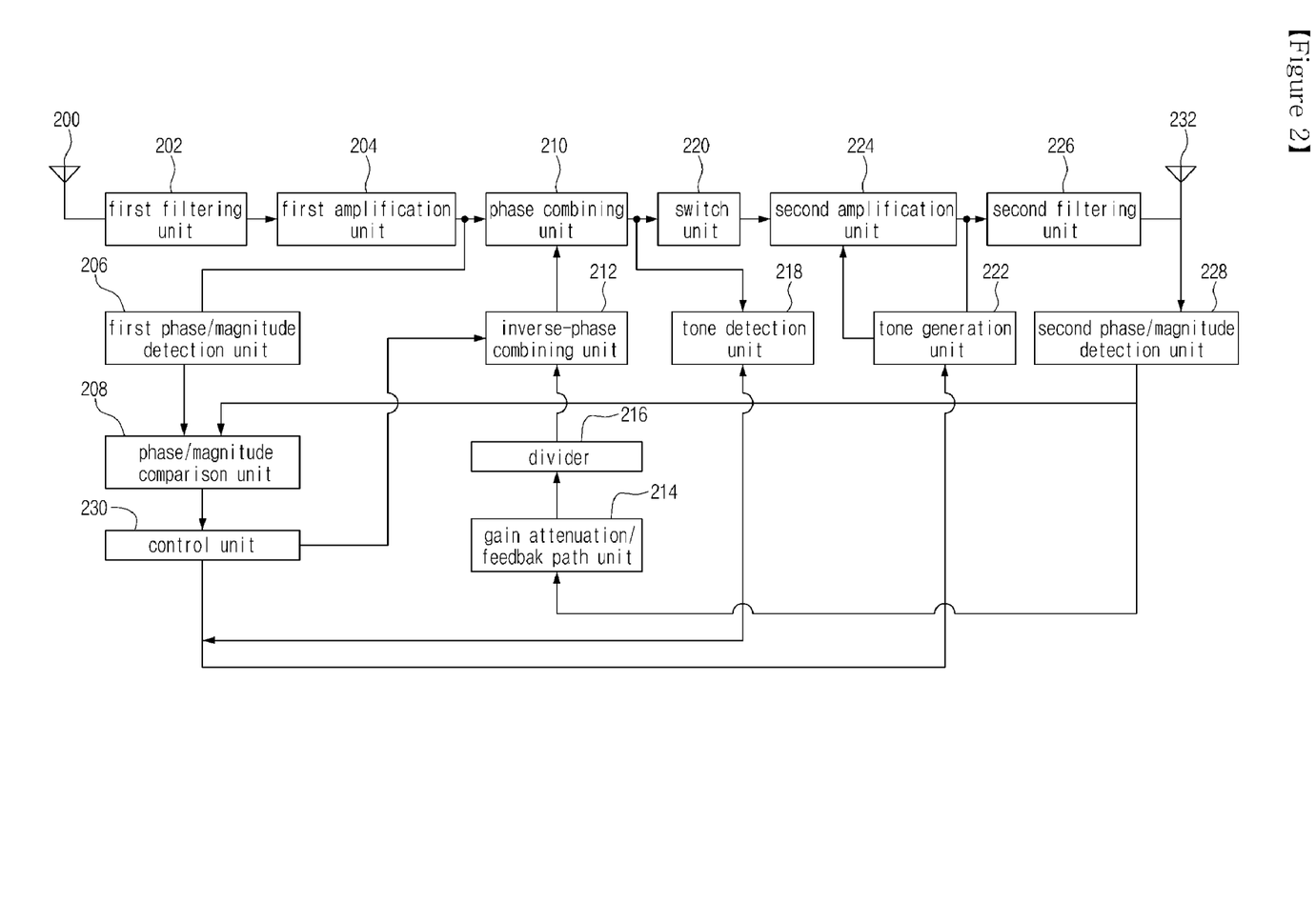
FIG. 2 is a diagram illustrating another example of a general radio repeater.

FIG. 2 illustrates another embodiment of Korean Publication No. 2002-0092031, which estimate the phase and magnitude of signals fed back to a receiving antenna using a specific tone and eliminating the feedback signals from receiving signals in receiving antenna utilizing the estimated phase and magnitude of signals, thereby preventing oscillation-related problems while the amplification gain of the radio repeater is not reduced.

Since the radio repeater illustrated in FIG. 2 the forward link and the reverse link operates in the same manner in CDMA and WCDMA systems, only the operational example of forward link can be described below. The radio repeater of FIG. 2 functions to detect the phase and magnitude of a specific tone which are transmitted through the transmission antenna and received from receiving antenna. After determining the inverse-phase by using detected specific tone information, it finally performs normal operation to eliminate the feedback signals.

The construction of FIG. 2 is described in more detail below.

First, in an initial operation state, a specific tone generated by the tone generating unit 222 of the radio repeater is inputted to a second amplification unit 224, is amplified therein, is filtered by a second filtering unit 226, and is then radiated toward a service area.

Next, the transmitting signals are received by a first antenna 200, are filtered by the first filtering unit 202, and are inputted to a phase combing unit 210. In this case, a first phase/magnitude detection unit 206 located ahead of the phase combing unit 210 detects variation values in the phase and magnitude of the specific tone and the detected variation values are input to a phase/magnitude comparator 208. The phase/magnitude comparator 208 compares the output values of the first phase/magnitude detection unit 206 with the phase and magnitude of the specific tone acquired by a second phase/magnitude detection unit 228 located subsequent to the second filtering unit 226 and transfers the comparison results to a control unit 230.

The control unit 230 transfers an inverse-phase value with respect to the specific tone, which is acquired using variation in the magnitude and phase with respect to the specific tone, to the tone generating unit 222 and an inverse-phase combing unit 212. Accordingly, the inverse-phase combing unit 212 eliminates the specific tone from receiving signals using the specific tone fed back through the first phase/magnitude detection unit 206, a gain attenuation/feedback path part 214, and a distributor 216. In this way, when the feedback signals are eliminated, a tone detection unit 218 measures the magnitude of a specific tone and, when it is less than a predetermined magnitude, informs the control unit 230 of it, and terminates the initial state operation.

Next, in the normal operational state, the radio repeater receives radio waves from a base station, amplifies them and radiates them toward a service area, and stops the tone generating unit 222, the first phase/magnitude detection unit 206 and the phase/magnitude comparison unit 208 from operating, and operates the inverse-phase combing unit 212 and the phase combing unit 210, thereby eliminating feedback signals using the phase and magnitude values acquired in the initial operation state with respect to the specific tone. At this time, the receiving signals passed through the phase combing unit 210, from which the feedback signals are eliminated, are amplified by the second amplification unit 224, are filtered by the second filtering unit 226 and are then radiated through the second antenna 232.

Furthermore, the tone detection unit 218 continues to monitor the output power of the receiving signals, from which the feedback signals are eliminated, passed through the phase combing unit 210, when the output power level of receiving signals is higher than a predetermined level, determines oscillation and transfers determination results to the control unit 230. Thereafter, the connection path between the phase combing unit 210 and the second amplification unit 224 is shut off by shutting off the switching unit 220, so that an initial state operation is performed again.

That is, the radio repeater of FIG. 2 finds out the phase and magnitude of feedback signals using a specific tone when signals radiated toward a service area are again fed back to a receiving antenna, and eliminates the feedback signals, thereby preventing the oscillation of signals.

DISCLOSURE

Technical Problem

However, there is a disadvantage in that desired signals can not be repeated while detecting the phase and magnitude of specific tone. Furthermore, in a radio environment, the phase and magnitude of feedback signals continuously vary due to variation in surrounding environments such as, movement of objects around there and the construction of a building, so that optimal phase and magnitude also vary. Therefore, if feedback signals are eliminated without periodical updating of the optimal phase and magnitude, residual feedback signal components still are remained even after the elimination of feedback signals. Therefore, there is a disadvantage in that signals are oscillated due to the residual feedback signal components.

In particular, when the mode of operation of the radio repeater is separated into an initial operation mode and a normal operation mode, it is impossible to service through the repeater in the initial operation mode. Even if possible, performance decreases and do not cope with the situation due to not being accommodate the continuous wave changes surrounding repeater.

Furthermore, since it is impossible to adjust the intensity of output power, stability can not be ensured upon sudden changes in a radio channel environment, and it is impossible to maintain the output signal quality between a base station and a mobile terminal to have a predetermined level.

Furthermore, Korean Patent No. 2003-0066062 proposes a method of repeatedly controlling adjustable components to have a minimum correlation using a plurality of signal combination ratios composed of the receiving signal S1 of a receiver and the receiving signal S2 of a transmitter, subtraction signals S1-S2 from which the two signals are subtracted, an orthogonal sum signal generated by delaying the subtraction signals S1-S2 by ¼ wavelength, output change due to variation in delay elements, and correlation due to output change and eliminating feedback interference signals. In this case, in order to eliminate adjacent interference signals, an antenna for the receiving signals of a receiver and an antenna for the receiving signals of a transmitter are arranged such that the space between two antennas is apart ½ wavelength. At the same time, since a simulator repeatedly changes a ratio by an uncertain magnitude to find out an optimal combing ratio which decreases correlation in order for adaptive operation for changeable environment, it is difficult to guarantee an ideal ratio.

Technical Solution

Accordingly, the present invention has been made keeping in mind the above problems occurring in the prior arts, and an object of the present invention is to provide an apparatus and method of a radio repeater which simultaneously analyzes channel characteristics in parallel and eliminates feedback signals so as to accommodate various multi-path environment conditions surrounding antennas and performs operation adaptively to propagation environments, ensures system stability function not to affect services upon detection of oscillation phenomenon, thereby improving the stability and reliability of a repeater and service quality.

Another object of the present invention is to provide an apparatus and method of a radio repeater which controls transmission time such that feedback signals and multi-path signals are not superposed, process many multi-path channel signals and eliminates even undesired noise signals guided to channels.

In order to accomplish the above object, the present invention provides a radio repeater comprising an analog signal processing unit and a digital signal processing unit, wherein the analog signal processing unit comprises a filtering unit for eliminating noise from receiving signals; a amplification unit on receiving side for receiving and amplifying output signals output of the filtering unit; a frequency conversion unit on receiving side for converting output signals of the amplification unit on receiving side into baseband signals; a frequency conversion unit on transmitting side for converting output signals of an automatic gain control unit into radio frequency band signals; and an amplification unit on transmitting side for amplifying and outputting output signals of the frequency conversion unit on transmitting side, and wherein the digital signal processing unit comprises a receiving signal detection unit for determining whether signals to be actually repeated exist in the output signals of the frequency conversion unit on receiving side; the automatic gain control unit for controlling a magnitude of output signals of the frequency conversion unit on receiving side; a feedback signal detection unit for updating phase and magnitude of feedback signals using phase and magnitude of feedback signals in an input signals, which is input from the frequency conversion unit on receiving side and the automatic gain control unit; a feedback signal combining unit for generating inverse-feedback signals using the updated phase and magnitude of feedback signals transferred from the feedback signal detection unit; a feedback signal elimination unit for combining the receiving signals output from the frequency conversion unit on receiving side and the inverse-feedback signals output from the feedback signal combining unit to eliminate the feedback signals; an automatic delay control unit for receiving control signals from a control unit and controlling the delay time of signals output from the automatic gain control unit to control multi-path channel environments; and the control unit.

In the radio repeater according to the present invention, the automatic gain control unit determines an optimal gain value such that system efficiency is maximized using a magnitude of receiving signals inputted from the frequency conversion unit on receiving side, a gain control value according to current states of the radio repeater, and a predetermined target output magnitude value inputted from the control unit, and outputs the receiving signals inputted from the feedback signal elimination unit based on the determined gain value.

In the radio repeater according to the present invention, the feedback signal detection unit detects phase and magnitude of residual feedback signals existing in baseband signals inputted from the automatic gain control unit and firstly updates the phase and magnitude of the feedback signals, and then detects the magnitude and phase of feedback signals included in the receiving signals using correlation between the baseband signals inputted from the frequency conversion unit on receiving side and output signals, the gain of which is automatically controlled, output from the automatic gain control unit, and secondly updates the phase and magnitude of the feedback signals.

In the radio repeater according to the present invention, the control unit controls the amplification unit on receiving side, operates and controls the automatic gain control unit, the feedback signal detection unit, the feedback signal combining unit, the feedback signal elimination unit and the automatic delay control unit when the receiving signals detection unit determines that signals to be actually repeated exist in the output signals of the frequency conversion unit on receiving side, transfers a predetermined target output magnitude value to the automatic gain control unit, transmits/receives multi-path analysis information to/from the feedback signal detection unit and the feedback signal combining unit, and, when signals to be actually repeated does not exist in the output signals of the frequency conversion unit on receiving side, stops operations of the automatic gain control unit, the feedback signal detection unit, the feedback signal combining unit, and the feedback signal elimination unit.

In the radio repeater according to the present invention, the feedback signal detection unit stores the phase and magnitude values of previous feedback signals and multi-path channel state information and operates adaptively to channel states.

The radio repeater according to the present invention further comprises an automatic delay control unit located between the automatic gain control unit and the frequency conversion unit on transmitting side to again receive feedback signals when multi-path signals are not received such that the multi-path signals and the feedback signals are not superposed.

In the radio repeater according to the present invention, the feedback signal detection unit comprises a plurality of delayers for delaying signals output from the automatic gain control unit; a correlator for calculating correlation values between signals delayed by plurality of delayers and signals inputted from the frequency conversion unit on receiving side; and a plurality of accumulators for accumulating the correlation values from the correlator; and the feedback signal detection unit simultaneously and in parallel performs a plurality (N) of functions so as to adaptively process signals fed back in various multi-path channel environments.

In the radio repeater according to the present invention, the feedback signal combing unit comprises a plurality of delayers for delaying the information of multi-path channels to be eliminated and signals output from the automatic gain control unit by a delay number provided by the control unit; a plurality of correlators for performing conjugate complex operation on output signals of respective delayers; and an adder for adding outputs of respective correlators to each other to combine multi-path feedback elimination signals.

In order to accomplish the above object, the present invention provides a method of repeating signals in the radio repeater, comprising the steps of filtering the receiving signals and then amplifying them; converting the amplified signals into baseband signals; determining whether transmission signals are included in the receiving signals which are converted into the baseband signals; updating phase and magnitude of feedback signals when the transmission signals are included in the receiving signals; generating inverse-feedback signals using the updated phase and magnitude of the feedback signals; combining the baseband signals and the inverse-feedback signals to eliminate the feedback signals included in the receiving signals; controlling output magnitude of the receiving signals, from which the feedback signals are eliminated; converting the signals, the output magnitude of which is controlled, into radio frequency band signals; and amplifying and outputting the radio frequency band signals.

Advantageous Effects

In the radio repeating method according to the present invention, the step of updating the phase and magnitude of feedback signals comprises the steps of performing a first updating using the phase and magnitude of the feedback signals included in the signals, the gain of which is controlled; and performing a second updating using correlation between the baseband signals and the signals, the gain of which is controlled.

In the radio repeating method according to the present invention, the step of controlling the magnitude of receiving signals is the step of determining the output magnitude using magnitude of baseband signals, a gain control value according to current states of the radio repeater and a predetermined target output magnitude value in the case of normal operation which oscillation is not detected.

In the radio repeating method according to the present invention, the feedback signals are received when the intensity of multi-path signals are weak or do not exist, such that multi-path signals and the feedback signals are not superposed when the multi-path signals exist.

In the radio repeating method according to the present invention, the step of controlling output magnitude of receiving signals is characterized by performing operation such that when oscillation is detected, the gain value converges into an optimal value for shortest time period from a minimum value which enables the termination of oscillation, thereby continuously operating a system even upon detection of oscillation.

DESCRIPTION OF DRAWINGS

The above and other objects, features and advantages of the present invention will be more clearly understood from the following detailed description taken in conjunction with the accompanying drawings, in which.

MODE FOR INVENTION

Reference now should be made to the drawings, in which the same reference numerals are used throughout the different drawings to designate the same or similar components.

Figure 3:
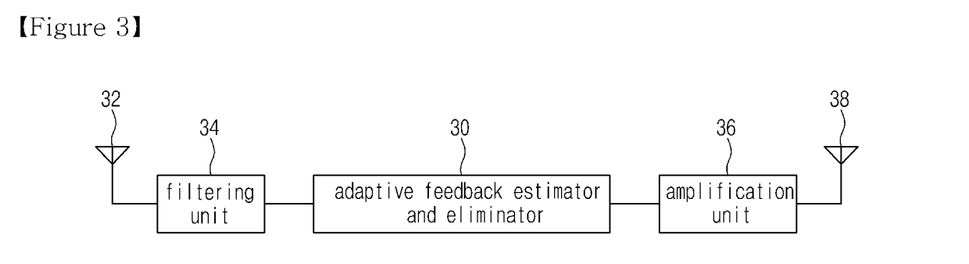
FIG. 3 is a diagram illustrating the construction of a radio repeater according to the present invention.

FIG. 3 is a diagram illustrating the construction of a radio repeater according to the present invention.

As illustrated in FIG. 3, the radio repeater according to the present invention includes a receiving antenna 32 for receiving signals to be repeated, a band-pass filtering unit 34 for filtering out noise components from signals received from the receiving antenna, an adaptive feedback estimator and eliminator 30 for eliminating feedback signals from signals output from the filtering unit 34 and controlling and outputting a gain, an amplification unit 36 for amplifying signals output from the adaptive feedback estimator and eliminator 30, and a transmitting antenna 38 for outputting the signals amplified by the amplification unit 36.

In this case, the adaptive feedback estimator and eliminator 30 eliminates feedback signals with respect to signals to be repeated, enables multi-path receiving signals and feedback signals not to interfere with each other, automatically controls a gain, thereby controlling the magnitude of output signals.

By implementing the above-described construction, it is possible to overcome the restriction of output power and the limitation of installation in the radio repeater used in a CDMA or WCDMA mobile communication system using the same transmitting/receiving frequencies, to acquire high output power characteristics, and to decrease installation cost.

Figure 4:
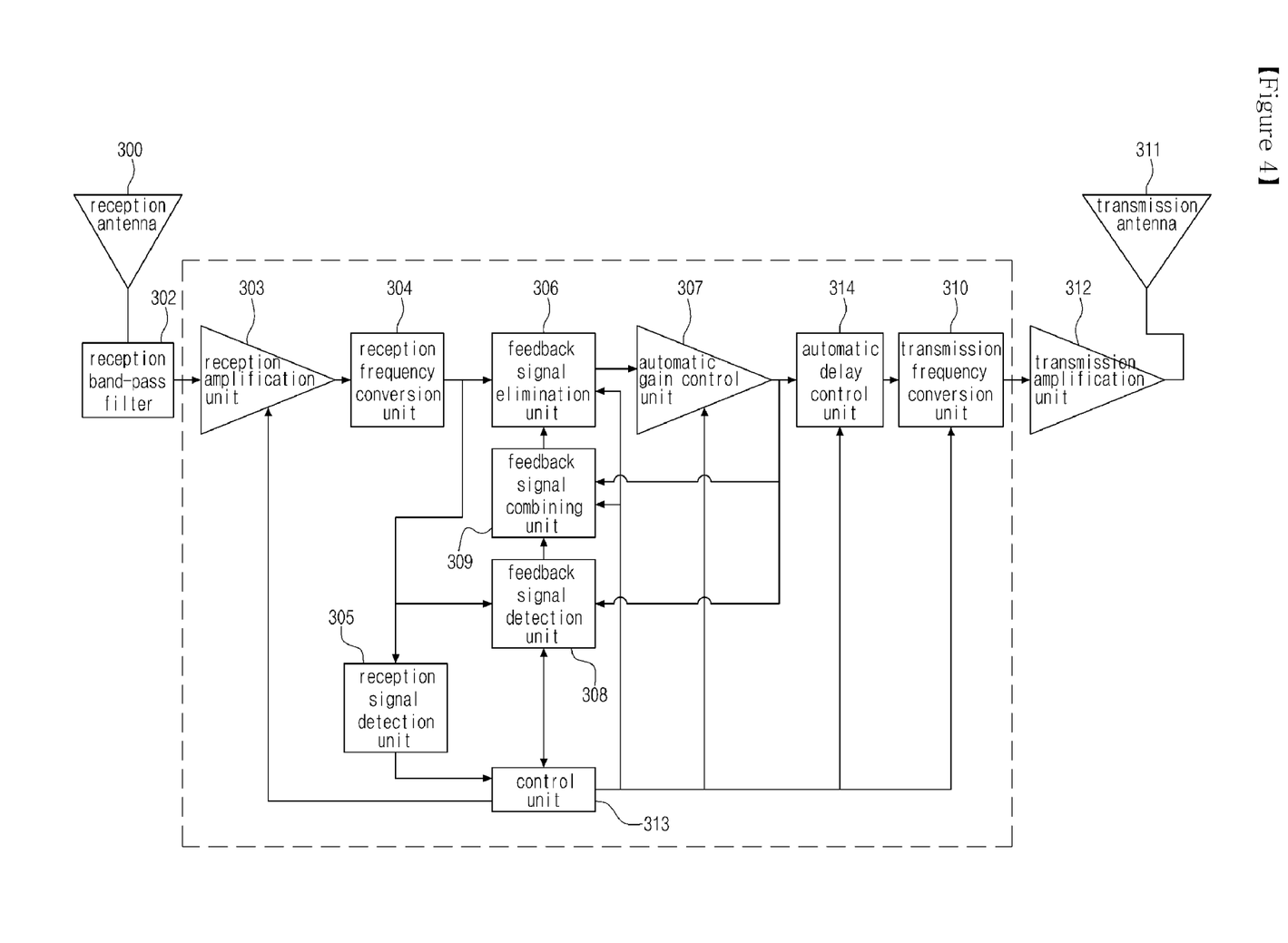
FIG. 4 is a diagram illustrating the radio repeater, illustrated in FIG. 3, in detail.

FIG. 4 is a diagram illustrating the detailed construction of the radio repeater illustrated in FIG. 3.

As illustrated in FIG. 4, the adaptive feedback estimator and eliminator 30 includes an amplification unit on receiving side 303 for receiving and amplifying signals output from the receiving band-pass filter 302, a frequency conversion unit on receiving side 304 for converting signals amplified by the amplification unit on receiving side 303 into baseband signals, a receiving signal detection unit 308 for determining whether signals to be actually repeated exist in the signals which are converted into the baseband signals, an automatic gain control unit 307 for automatically controlling the output signal magnitude of signals to be repeated, a feedback signal detection unit 308 for detecting the phase and magnitude of residual feedback signals existing within signals to be repeated from baseband signals inputted from the automatic gain control unit 307 and baseband signals inputted from the frequency conversion unit on receiving side 304, and updating the phase and magnitude of feedback signals therefrom, a feedback signal combining unit 309 for generating inverse-feedback signals for elimination of feedback signal existing within the baseband receiving signals inputted from the frequency conversion unit on receiving side 304 using the phase and magnitude of feedback signals output from the feedback signal detection unit 308 and baseband signals inputted from the automatic gain control unit 307, a feedback signal elimination unit 306 for combining the receiving signals output from the frequency conversion unit on receiving side 304 and the inverse-feedback signals output from the feedback signal combining unit 309 and eliminating feedback signals existing within receiving signals, a frequency conversion unit on transmitting side 310 for converting the frequency band of the receiving signals, from which feedback signals are eliminated, into a radio frequency band, an automatic delay control unit 314 for transmitting signals by avoiding multi-path signals and a control unit 313.

In FIG. 4, the automatic control unit 307 determines a most appropriate gain value using the magnitude of receiving signals inputted from the frequency conversion unit on receiving side 304, an automatic control value based on the current state of the adaptive feedback estimator and eliminator 30 and a predetermined target output magnitude value inputted from the control unit 313, and automatically controls the magnitude of receiving signals, from which feedback signals are eliminated by the feedback elimination unit 306, using the gain value.

The feedback signal detection unit 308 detects the magnitude and phase of feedback signals included in receiving signals using correlators, that is, the magnitude and phase of residual feedback signals existing in baseband signals inputted from the automatic gain control unit 307 and the magnitude and phase of signals inputted from the frequency conversion unit on receiving side 304, updates the magnitude and phase of feedback signals, estimates a plurality of channel characteristics which vary every moment, and outputs the results thereof to the control unit 313.

The automatic delay control unit 314 calculates delay time for avoiding time at which multi-path signals are generated according to channel characteristics estimated by the feedback signal detection unit 308 such that the multi-path signals generated by channels and transmitted feedback signals are not superposed, and outputs transmission signals, thereby operating adaptively to channels which vary every moment, and thus, stably operating even in various environments surrounding antennas.

Furthermore, the control unit 313 controls the operations of the amplification unit on receiving side 303 and controls the operation of the automatic gain control unit 307, the feedback signal detection unit 308, the feedback signal combining unit 309 and the feedback signal elimination unit 306 depending on the results of determination of whether the transmission signals of the receiving signal detection unit 305 exist. If the transmission signals are included in the receiving signals, the control unit 313 enables the automatic gain control unit 307, the feedback signal detection unit 308, the feedback signal combining unit 309 and the feedback signal elimination unit 306 to normally operate. In this case, a target output magnitude value is set to a specific value, and is delivered to the automatic gain control unit 307.

In contrast, if the transmission signals are not included in the receiving signals, the control unit 313 stops the automatic gain control unit 307, the feedback signal detection unit 308, the feedback signal combining unit 309 and the feedback signal elimination unit 306 from operating. In this case, it is preferred that the feedback signal detection unit 308 stores the phase and magnitude values of the last feedback signal.

Next, the operation of the radio repeater according to the present invention illustrated in FIGS. 3 and 4 is described with reference to FIG. 5 below.

Figure 5:
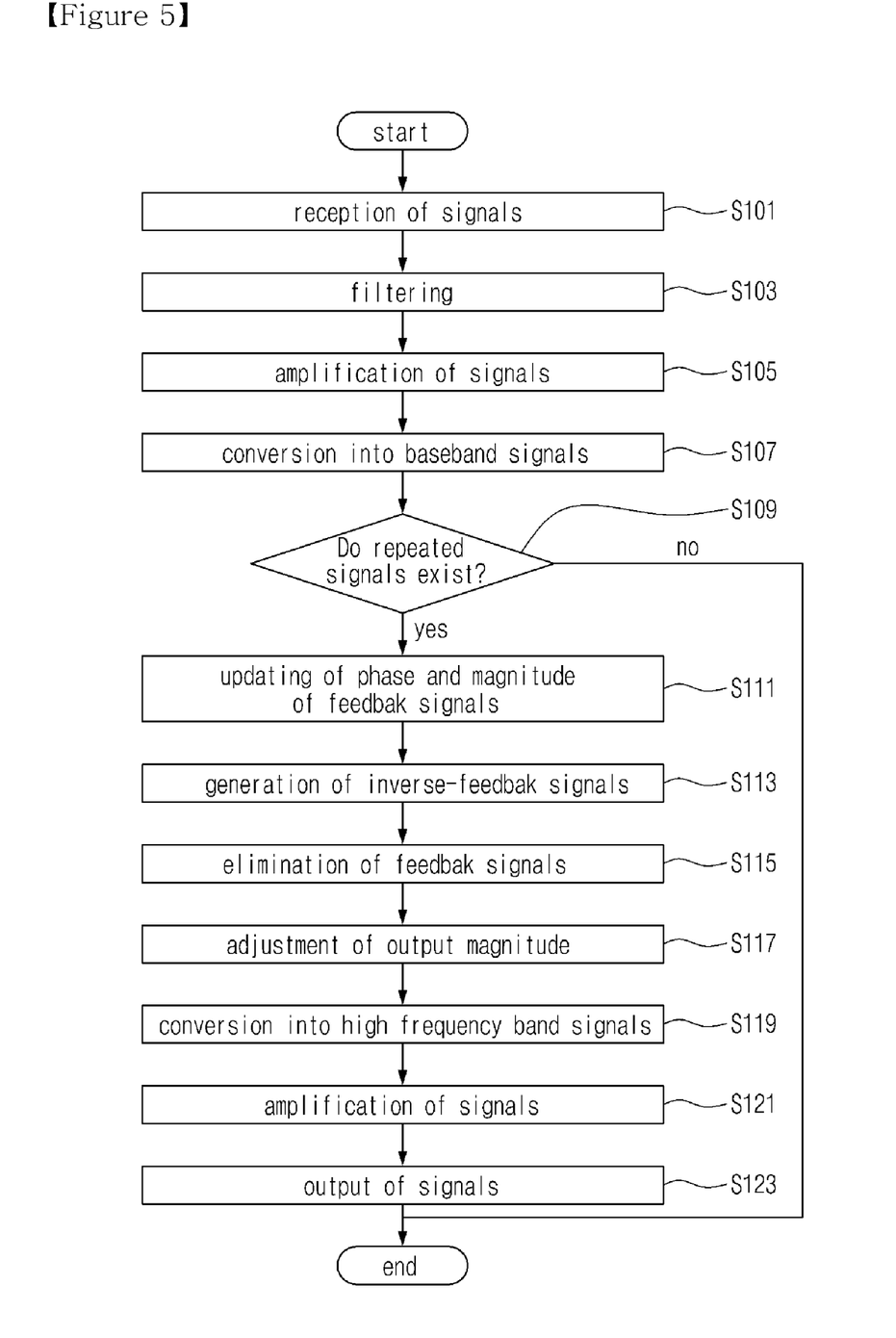
FIG. 5 is a flowchart illustrating a radio repeating method according to the present invention.

FIG. 5 is a flowchart illustrating a radio repeating method according to the present invention, which repeats initial signals and then eliminates feedback signals existing in subsequent signals to be repeated using feedback signals generated therefrom.

In CDMA or WCDMA mobile communication systems, a radio repeater has a forward link and a reverse link having the same structure as each other, so that operation related with the forward link is only taken as an example and described.

In signals received from the receiving band-pass filter 302 through the receiving antenna 300, signals transmitted by a base station so as to repeat actual services and feedback signals in which signals radiated toward the air through the transmitting antenna 311 are again fed back may exist simultaneously, or feedback signals only including unspecific noises could be exist. Transmission signals from a base station are represented as multi-path signals according to a radio channel environment, and, the case in which feedback signals only exist in receiving signals is the case in which the base station does not transmit signals to a mobile communication terminal.

When signals are received through the receiving antenna 300 at step S101, the receiving band-pass filter 302 filters them at step S103 and transfers them to the amplification unit on receiving side 303. Therefore, the amplification unit on receiving side 303 amplifies the filtered signals at step S105 and the frequency band of the amplified signals are converted into baseband signals by the frequency conversion unit on receiving side 304 at step S107.

Thereafter, the receiving signal detection unit 305 determines whether transmission signals exist in the receiving signals which are converted into baseband signals at step S109, and then transfers the results thereof to the control unit 313. If transmission signals exist in the receiving signals, the control unit 313 enables the automatic gain control unit 307, the feedback signal detection unit 308, the feedback signal combining unit 309 and the feedback signal elimination unit 306 to normally operate, thereby enabling the feedback signal detection unit 308 to update the phase and magnitude of feedback signals at step S111.

Next, the feedback signal combining unit 309 generates inverse-feedback signals using the updated phase and magnitude of feedback signals at step S113. Then, the feedback signal elimination unit 306 combines the baseband receiving signals and the inverse-feedback signals to eliminate feedback signals included in the receiving signals.

After the feedback signals have been eliminated from signals to be transmitted, the automatic gain control unit 307 automatically controls the output magnitude of the receiving signals at step S117. At this time, the automatic gain control unit 307 determines the most appropriate gain value using the magnitude of the receiving signals inputted from the frequency conversion unit on receiving side 304, a gain control value based on the current state of the adaptive feedback estimator and eliminator 30, and a predetermined target output magnitude value inputted from the control unit 313, and amplifies or attenuates the magnitude of the receiving signals, from which the feedback signals are eliminated, thereby automatically controlling the magnitude of output signals.

Thereafter, the signals, the gain of which is controlled, are converted into radio frequency band signals by the frequency conversion unit on transmitting side 310 at step S119, are amplified by the amplification unit on transmitting side 312, and are then transmitted through the transmitting antenna 311.

In the above description, the step S111 of updating the phase and magnitude of feedback signals updates the phase and magnitude of feedback signals using the correlation between the baseband signals inputted from the frequency conversion unit on receiving side 304 and the output signals, the gain of which is automatically controlled, output from the automatic gain control unit 307, and provides channel characteristic information for provision of multi-path information.

That is, when oscillation is detected in a step of controlling the output power of receiving signals, the present invention performs the operation such that a minimum gain value, which enforces the termination of the oscillation, converges to an optimal value within shortest time period, thereby continuously operating a system even upon detection of oscillations.

Next, the construction of FIG. 4 is described in more detail with reference to FIGS. 6 and 7.

Figure 6:
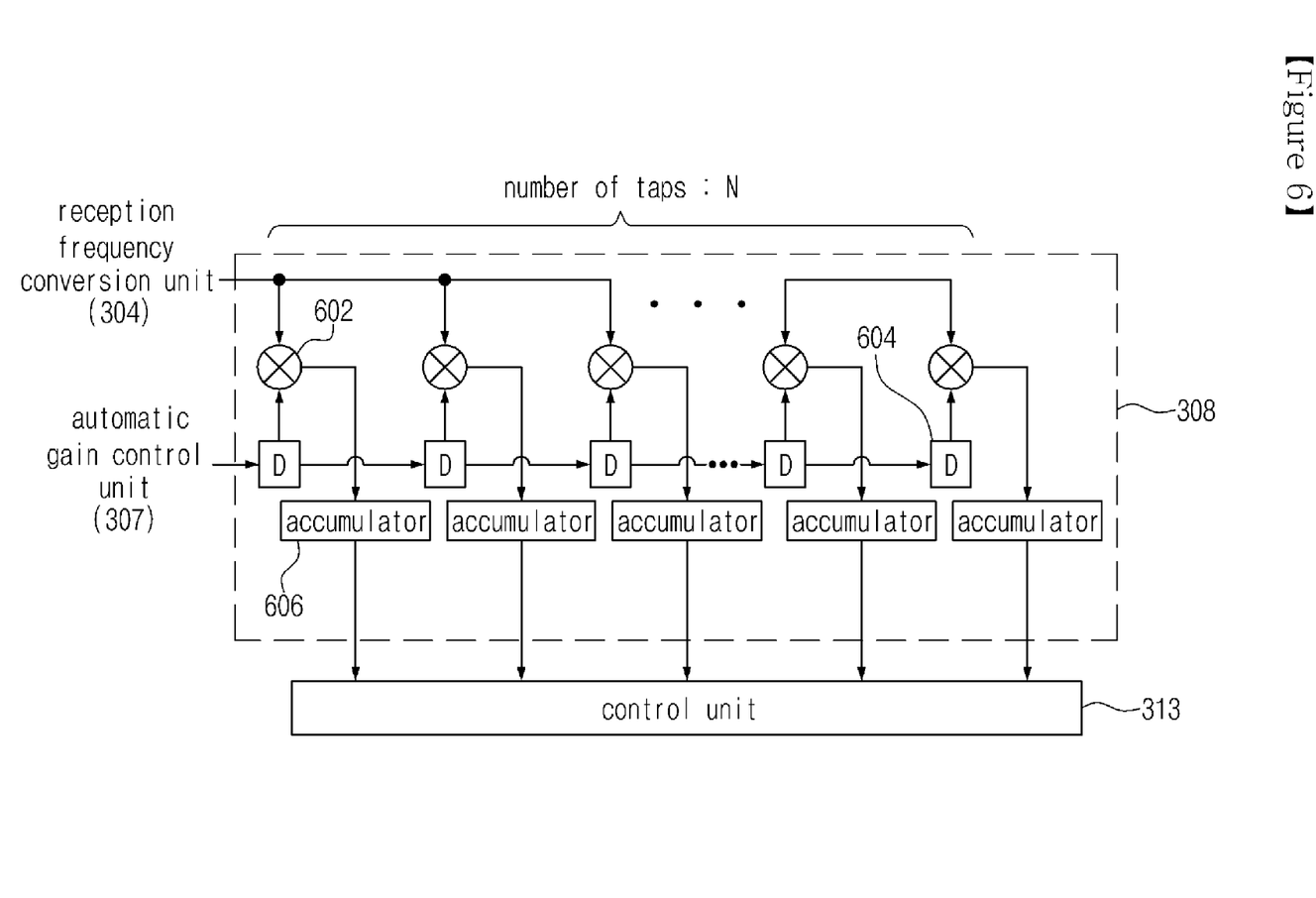
FIG. 6 is a diagram illustrating the construction of a feedback signal detection unit, illustrated in FIG. 4, in detail.

FIG. 6 is a diagram illustrating the construction of the feedback signal detection unit 308 illustrated in FIG. 4 in detail, which represents a process of detecting feedback signals. Signals inputted from the frequency conversion unit on receiving side 304 of FIG. 4 and signals inputted from the automatic gain control unit 307 of FIG. 4 pass through a delayer 604. Correlation operation can be applied on the signals by a correlator 602 which outputs the signals to accumulators 606, which analyzes the multi-path channel feedback signals. The number of the accumulators 606 may be N which is the number of multi paths on which estimation be performed, the operations thereof are simultaneously performed. The accumulation results of the accumulator 606 are inputted to the control unit 301. The control unit 301 determines multi-path feedback noise to be processed based on the multi-path information, predefined threshold value and the accumulation results.

Figure 7:
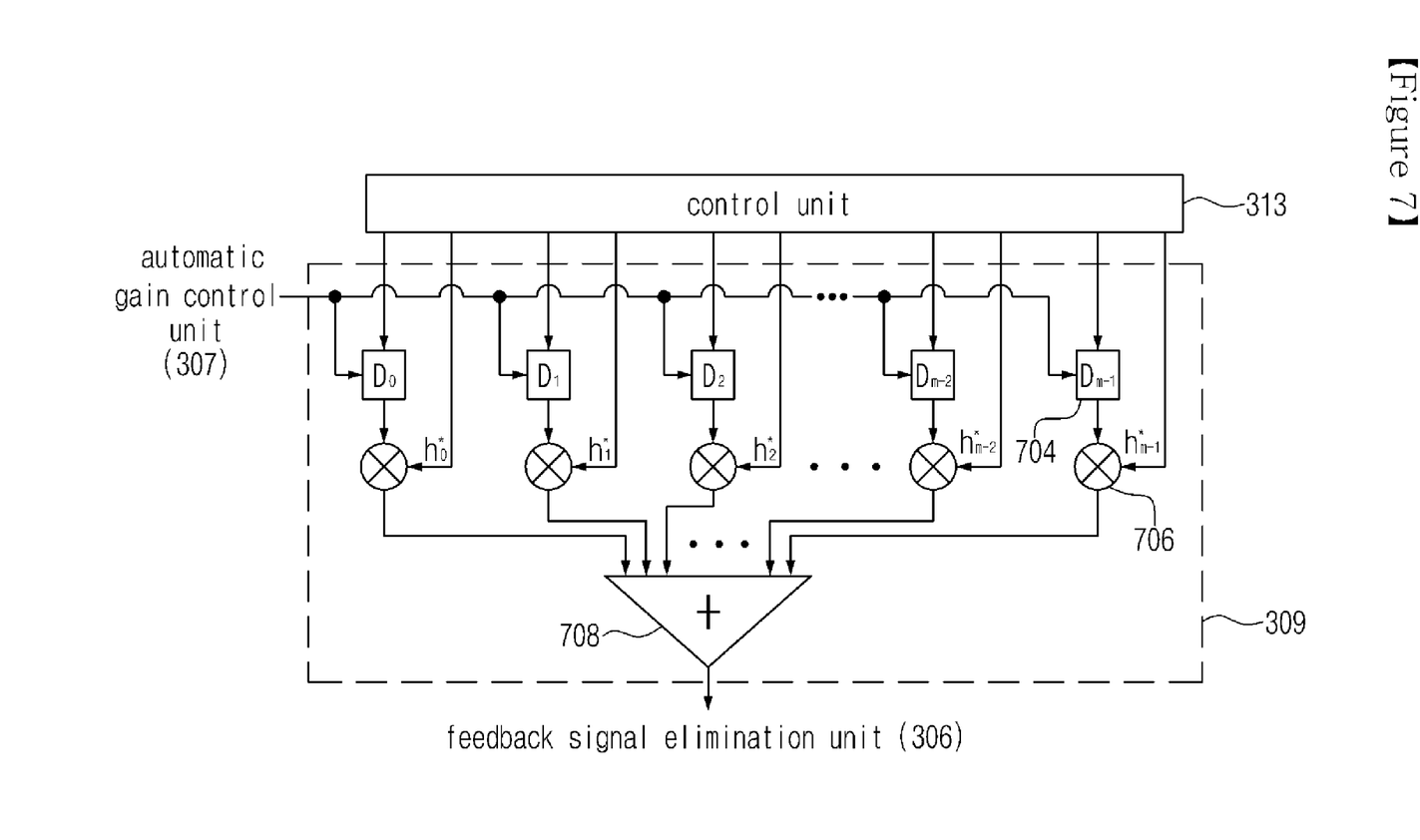
FIG. 7 is a diagram illustrating the construction of a feedback signal combing unit, illustrated in FIG. 4.

FIG. 7 is a diagram illustrating the construction part of the feedback combining unit 309 illustrated in FIG. 4. The control unit 301 determines the path of feedback noise to be processed based on detection results in the feedback signal detection unit 308, transfers this information and multi-path channel information to a plurality of delayers 704 and the correlators 706. Signals output from the automatic gain control unit 307 pass through the plurality of delayers 704 and are then inputted to the plurality of correlators 706. The plurality of correlators 706 perform a conjugate complex operation on respective output signals from the plurality of delayers 704, generate feedback elimination signals for channels to be eliminated among respective channels of the multi-path. The feedback elimination signals are added to each other in an adder 708 and are then inputted to the feedback signal elimination unit 306.

Meanwhile, it is preferred that feedback signals should be controlled to be inputted when multi-path signals do not exist. When multi-path signals and feedback signals are superposed on each other and re-received, accurate radio channel characteristics can not be estimated and, therefore, the feedback signals can not be accurately eliminated. As a result, the reason for this is to receive feedback signals at moment in which multi-path signals are not received, which is performed in the automatic delay control unit 314.

As described above, according to the apparatus and method of radio repeater for mobile communication systems therefore according to the present invention, when radio repeating services are provided on forward and reverse links, feedback signals are eliminated using transmitting and receiving signals governed by changes in a surrounding channel environment, and the magnitude of output signals can be controlled automatically by adjusting a gain, so that there are advantages in that installation cost decreases and limitations in output power and installation are eliminated and high output power characteristics are ensured.

Furthermore, according to the radio repeater and the method therefore according to the present invention, the input time of feedback signals is delayed such that the feedback signals are not inputted simultaneously with multi-path signals, so that there is an advantage in that the multi-path signals and feedback signals are distinguished from each other thereby effectively eliminating the feedback signals. At the same time, it being operated without stopping repeat services to eliminate feedback signals, there can be obtained an advantage in that channel estimation values are updated adaptively in accordance with changes in a surrounding environment while services are continuously provided.

In particular, oscillation phenomenon will be removed by adapting a surrounding environment change, so the stability can be improved, high quality of service can be maintained to a predetermined level by providing uniform magnitude of output power, and can be applied to various mobile communication system.

Although the preferred embodiments of the present invention have been disclosed for illustrative purposes, those skilled in the art will be appreciated various modifications, additions and substitutions are possible, without departing from the scope and spirit of the invention as disclosed in the accompanying claims.

The invention claimed is:

1. A radio frequency repeater comprising an analog signal processing unit and a digital signal processing unit, wherein the analog signal processing unit comprises:
   a filtering unit for eliminating noise from receiving signals;
   an amplification unit on receiving side for receiving and amplifying output signals output of the filtering unit;
   a frequency conversion unit on receiving side for converting output signals of the amplification unit on receiving side into baseband signals;
   a frequency conversion unit on transmitting side for converting output signals of an automatic gain control unit into radio frequency band signals; and
   an amplification unit on transmitting side for amplifying and outputting output signals of the frequency conversion unit on transmitting side, and
   wherein the digital signal processing unit comprises:
   a receiving signal detection unit for determining whether signals to be actually repeated exist in the output signals of the frequency conversion unit on receiving side;
   an automatic gain control unit for controlling a amplitude of output signals of the frequency conversion unit on receiving side;
   a feedback signal detection unit for updating phase and amplitude of feedback signals using phase and amplitude of feedback signals in an input signals, which is input from the frequency conversion unit on receiving side and the automatic gain control unit;
   a feedback signal combining unit for generating inverse-feedback signals using the updated phase and amplitude of feedback signals transferred from the feedback signal detection unit;
   a feedback signal elimination unit for combining the receiving signals output from the frequency conversion unit on receiving side and the inverse-feedback signals output from the feedback signal combining unit to eliminate the feedback signals;
   an automatic delay control unit for receiving control signals from a control unit and controlling delay time of signals output from the automatic gain control unit to control multi-path environment; and
   the control unit.

2. The radio frequency repeater as set forth in claim 1, wherein the automatic gain control unit determines an optimal gain value such that system efficiency is maximized using a magnitude of receiving signals inputted from the frequency conversion unit on receiving side, a gain control value according to current states of the radio frequency repeater, and a predetermined target output magnitude value inputted from the control unit, and outputs the receiving signals inputted from the feedback signal elimination unit based on the determined gain value.

3. The radio repeater as set forth in claim 1, wherein the feedback signal detection unit detected phase and amplitude of residual feedback signals existing in baseband signals inputted from the automatic gain control unit and firstly updates the phase and amplitude of the feedback signals, and then detects the magnitude and phase of feedback signals included in the receiving signals using correlation between the baseband signals inputted from the frequency conversion unit on receiving side and output signals, the gain of which is automatically controlled, output from the automatic gain control unit and secondly updates the phase and amplitude of the feedback signals.

4. The radio repeater as set forth in claim 1, wherein the control unit controls the amplification unit on receiving side, operates and controls the automatic gain control unit, the feedback signal detection unit, the feedback signal combining unit, the feedback signal elimination unit and the automatic delay control unit when the receiving signals detection unit determines that signals to be actually repeated exist in the output signals of the frequency conversion unit on receiving side, transfers a predetermined target output magnitude value to the automatic gain control unit, transmits/receives multi-path analysis information to/from the feedback signal detection unit and the feedback signal combining unit, and, when signals to be actually does not exist in the output signals of the frequency conversion unit on receiving side, stops operations of the automatic gain control unit, the feedback signal detection unit, the feedback signal combining unit, and the feedback signal elimination unit.

5. The radio repeater as set forth in claim 1, wherein the feedback signal detection unit stores the phase and amplitude of previous feedback signals and multi-path channel state information and operates adaptively to channel states.

6. The radio repeater as set forth in claim 1, further comprising an automatic delay control unit located between the automatic gain control unit and the frequency conversion unit on transmitting side to receive feedback signals in order not to superpose multi-path signals feedback signals, so only the feedback signal can be received at the time of the multi-path signal are not received.

7. The radio repeater as set forth in claim 1, wherein the feedback signal detection unit comprises:
a plurality of delayers for delaying signals output from the automatic gain control unit;
a correlator for calculating correlation values between signals delayed by the plurality of delayers and signals inputted from the frequency conversion unit on receiving side; and
a plurality of accumulators for accumulating the correlation values from the correlator; and
the feedback signal detection unit simultaneously and in parallel performs a plurality (N) of functions so as to adaptively process signals fed back in various multi-path channel environments.

8. The radio repeater as set forth in claim 1, wherein the feedback signal combing unit comprises:
a plurality of delayers for delaying the information of multi-path channels to be eliminated and signals output from the automatic gain control unit by a delay number provided by the control unit;
a plurality of correlators for performing conjugate complex operation on output signals of respective delayers; and
an adder for adding outputs of respective correlators to each other to combine multi-path feedback elimination signals.

9. A method of repeating signals in radio frequency repeater, comprising the steps of
filtering receiving signals and then amplifying them;
converting the amplified signals into baseband signals;
determining whether transmission signals are included in the receiving signals which are converted into the baseband signals;
updating phase and amplitude of feedback signals when the transmission signals are included in the receiving signals, by performing a first updating using the phase and amplitude of the feedback signals included in the signals, the gain of which is controlled; and performing a second updating using correlation between the baseband signals and the signals, the gain of which is controlled;
generating inverse-feedback signals using the updated phase and amplitude of the feedback signals;
combining the baseband signals and the inverse-feedback signals to eliminate the feedback signals included in the receiving signals;
controlling output amplitude of the receiving signals, from which the feedback signals are eliminated;
converting the signals, the output amplitude of which is controlled, into radio frequency band signals; and
amplifying and outputting the radio frequency band signals.

10. The method as set forth in claim 9, wherein the step of controlling the amplitude of receiving signals is the step of determining the output amplitude using amplitude of baseband signals, a gain control value according to current states of the radio frequency repeater and a predetermined target output magnitude value in the case of normal operation which oscillation is not detected.

11. The method as set forth in claim 10, wherein the step of controlling output amplitude of receiving signals is characterized by performing operation such that when oscillation is detected, the gain value converges into an optimal value for shortest time period from a minimal value which enforces the termination of oscillation, thereby a system can be operated continuously even upon the detection of oscillation.

12. The method as set forth in claim 7, wherein the feedback signals are received when the intensity of multi-path signals are weak or do not exist, such that multi-path signals and the feedback signals are not superposed when the multi-path signals exist.

* * * * *